US012593308B2

(12) United States Patent
Wang et al.

(10) Patent No.: US 12,593,308 B2
(45) Date of Patent: Mar. 31, 2026

(54) COMMUNICATION METHOD AND APPARATUS

(71) Applicant: HUAWEI TECHNOLOGIES CO., LTD., Shenzhen (CN)

(72) Inventors: Nanxin Wang, Shanghai (CN); Wenjie Peng, Shanghai (CN); Qiang Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 18/331,301

(22) Filed: Jun. 8, 2023

(65) Prior Publication Data

US 2023/0319782 A1      Oct. 5, 2023

Related U.S. Application Data

(63) Continuation of application No. PCT/CN2020/135428, filed on Dec. 10, 2020.

(51) Int. Cl.
| | |
|---|---|
| *H04W 68/02* | (2009.01) |
| *H04W 76/20* | (2018.01) |
| *H04W 88/04* | (2009.01) |

(52) U.S. Cl.
CPC ........... *H04W 68/02* (2013.01); *H04W 76/20* (2018.02); *H04W 88/04* (2013.01)

(58) Field of Classification Search
CPC ...... H04W 68/02; H04W 76/20; H04W 88/04
See application file for complete search history.

(56) References Cited

U.S. PATENT DOCUMENTS

| | | | |
|---|---|---|---|
| 2017/0244469 A1 | 8/2017 | Seo et al. | |
| 2017/0245254 A1* | 8/2017 | Kitagawa | H04W 8/00 |
| 2017/0331670 A1* | 11/2017 | Parkvall | H04W 52/0229 |
| 2019/0349951 A1* | 11/2019 | Ahmad | H04W 76/18 |
| 2020/0120482 A1* | 4/2020 | Parkvall | H04L 65/1023 |

(Continued)

FOREIGN PATENT DOCUMENTS

| | | |
|---|---|---|
| CN | 108207017 A | 6/2018 |
| CN | 110832942 B | 9/2021 |
| WO | 2018216774 A1 | 11/2018 |

OTHER PUBLICATIONS

Intel Corporation, "Impact on User Plane Protocol Stack and Control Plane Procedure for Sidelink Relay", 3GPP TSG-RAN WG2 Meeting#111e, R2-2007608, Aug. 17-28, 2020, 10 pages.

(Continued)

*Primary Examiner* — Ajay Cattungal

(74) *Attorney, Agent, or Firm* — Maier & Maier, PLLC

(57) ABSTRACT

A communication method and apparatus, related to the field of communication technologies. The method includes: a first network device sends configuration information of a first communication resource to a first terminal device. The first terminal device may configure the first communication resource based on the received configuration information. The first terminal device may listen to a paging message that is broadcast by the first network device on the first communication resource and that is used for paging a second terminal device, so that the first terminal device in a connected state can listen to a paging message for the second terminal device, and the second terminal device can establish a communication connection to the first network device.

18 Claims, 10 Drawing Sheets

(56) References Cited

U.S. PATENT DOCUMENTS

| | | | | |
|---|---|---|---|---|
| 2020/0314713 | A1* | 10/2020 | Jung | H04W 4/40 |
| 2020/0396782 | A1* | 12/2020 | Russell | H04W 4/50 |
| 2022/0046648 | A1* | 2/2022 | Kiilerich Pratas | H04W 48/16 |
| 2023/0037084 | A1* | 2/2023 | Jung | H04W 4/70 |
| 2023/0413229 | A1* | 12/2023 | Wang | H04W 4/06 |

OTHER PUBLICATIONS

ZTE Corporation et al., "Discussion on Service Continuity", 3GPP TSG RAN WG2 Meeting #112 Electronic, R2-2009031, Nov. 2-13, 2020, 9 pages.

Intel et al., "Update on Solution for Key Issue #6 in Clause 6.6.2", 3GPP TSG SA WG2 Meeting #122-bis, S2-176337, Aug. 21-25, 2017, 2 pages.

3GPP TR 36.746, "3rd Generation Partnership Project; Technical Specification Group Radio Access Network; Study on Further Enhancements to LTE Device to Device (D2D), User Equipment (UE) to Network Relays for Internet of Things (IoT) and Wearables; (Release 15)", 3GPP Organizational Partners, Apr. 2018, V15.1.1, 55 pages.

Qualcomm Incorporated, "RRC State and Essential RRC Procedures in L2 U2N Relay", 3GPP TSG RAN WG2 Meeting #112-e, R2-2008966, Nov. 2-13, 2020, 8 pages.

Interdigital Inc., "Control Plane Aspects for UE to NW Relays", 3GPP RAN WG2 Meeting #112 electronic, R2-2009202, Nov. 2020, 5 pages.

LG Electronics Inc., "Report of Offline Discussion #15", 3GPP TSG-RAN WG2 #101, R2-1804045, Feb. 26-Mar. 2, 2018, 11 pages.

* cited by examiner

1400

150

COMMUNICATION METHOD AND APPARATUS

CROSS-REFERENCE TO RELATED APPLICATIONS

This application is a continuation of International Application No. PCT/CN2020/135428, filed on Dec. 10, 2020, the disclosure of which is hereby incorporated by reference in its entirety.

TECHNICAL FIELD

The embodiments relate to the field of communication technologies, a communication method, and an apparatus.

BACKGROUND

With development and improvement of communication technologies, one device may provide a communication service for another device. For example, in a layer 2 (L2) relay system architecture of user equipment to network (U2N), a relay terminal (relay UE) may listen to a paging message of a remote terminal (remote UE), so that the remote terminal can establish a connection to a base station through the relay terminal after receiving the paging message, and perform data transmission or voice transmission.

Generally, when the relay terminal is in an idle mode (IDLE) or an inactive state (which may be referred to as a third state), the relay terminal may listen to a paging message broadcast by the base station on an initial bandwidth part (initial BWP). Further, the relay terminal decodes an identifier (ID) of the remote terminal in the paging message, and the relay terminal sends the paging message to the remote terminal.

However, when the relay terminal is in the connected mode, the base station activates an active BWP for the relay terminal, and the active BWP cannot ensure that the relay terminal listens to the paging message broadcast by the base station on the initial BWP, so that the relay terminal cannot meet a requirement of monitoring the paging message for the remote terminal.

SUMMARY

The embodiments may provide a communication method and apparatus. A first network device sends configuration information of a first communication resource to a first terminal device. The first terminal device may configure the first communication resource based on the received configuration information. In this way, the first terminal device can listen to a paging message that is broadcast by the first network device on the first communication resource and that is used for paging a second terminal device, so that the first terminal device can listen to the paging message for the second terminal device, and the second terminal device can establish a communication connection to the first network device.

According to a first aspect, an embodiment may provide a communication method. The communication method may be applied to a first network device or may be applied to a component (for example, a chip, a chip system, or a processor) of the first network device. The method includes: sending configuration information of a first communication resource to a first terminal device, where the first terminal device provides a relay service for a second terminal device, and the first communication resource is used for communication between the first terminal device in a connected state and the first network device; and broadcasting, through the first communication resource, a paging message used for paging the second terminal device. In this way, the first network device may correctly page the second terminal device through the paging message, so that the first network device establishes a communication connection to the second terminal device.

In a possible implementation, the first communication resource includes a second communication resource, and the broadcasting, through the first communication resource, the paging message used for paging the second terminal device includes: broadcasting the paging message through the second communication resource, where the second communication resource is used for receiving data by a terminal device in a disconnected state. In this way, the first terminal device may receive the paging message based on the second communication resource, to meet a requirement of the first terminal device for monitoring the paging message for the second terminal device.

In a possible implementation, the first terminal device is a relay terminal device, and the second terminal device is a remote terminal device. In this way, the first terminal device may provide the relay service for the second terminal device, so that communication of the second terminal device is not restricted by a region.

In a possible implementation, the first communication resource is an active bandwidth part (BWP), and the second communication resource is an initial bandwidth part (BWP).

In a possible implementation, first information is received from the first terminal device, where the first information indicates that a sidelink connection exists between the first terminal device and the second terminal device.

In a possible implementation, the first information includes identifier information of the second terminal device.

In a possible implementation, the paging message includes a paging message related to the identifier information of the second terminal device.

In a possible implementation, the identifier information of the second terminal device includes a 5G s-temporary mobile subscriber identity (5G-S-TMSI) or a full inactive radio network temporary identifier (full I-RNTI).

In a possible implementation, the disconnected state includes an idle state or an inactive state.

In a possible implementation, the identifier information of the second terminal device is sent to the second network device. The second network device is a target network device for handover of the first terminal device.

According to a second aspect, an embodiment may provide a communication method. The communication method may be applied to a first terminal device or may be applied to a component (for example, a chip, a chip system, or a processor) of the first terminal device. The method includes: receiving configuration information of a first communication resource from a first network device, where the first terminal device provides a relay service for a second terminal device, and the first communication resource is used for communication between the first terminal device in a connected state and the first network device; configuring the first communication resource based on the configuration information; and receiving a paging message based on the first communication resource, where the paging message is used for paging the second terminal device. In this way, the first terminal device in the connected state may receive the paging message of the second terminal device based on the first communication resource, so that the first terminal device can meet a requirement of monitoring the paging message for the second terminal device, and the second terminal device can establish a communication connection to the first network device.

In a possible implementation, the first communication resource includes a second communication resource, and the receiving a paging message based on the first communication resource includes: receiving the paging message based on the second communication resource, where the second communication resource is used for receiving data by a terminal device in a disconnected state. In this way, the second terminal device may establish a communication connection to the first network device based on the paging message.

In a possible implementation, the first terminal device is a relay terminal device, and the second terminal device is a remote terminal device. In this way, the first terminal device may provide the relay service for the second terminal device, so that communication of the second terminal device is not restricted by a region.

In a possible implementation, the first communication resource is an active bandwidth part (BWP), and the second communication resource is an initial bandwidth part (BWP).

In a possible implementation, the method further includes: sending first information to the first network device, where the first information indicates that a sidelink connection exists between the first terminal device and the second terminal device.

In a possible implementation, the first information is a dedicated information element.

In a possible implementation, the first information includes identifier information of the second terminal device.

In a possible implementation, the paging message includes a paging message related to the identifier information of the second terminal device.

In a possible implementation, the identifier information of the second terminal device includes a 5G s-temporary mobile subscriber identity (5G-S-TMSI) or a full inactive radio network temporary identifier (full I-RNTI).

In a possible implementation, the method further includes: sending the paging message to the second terminal device; or sending second indication information to the second terminal device, where the second indication information indicates that the second terminal device is paged.

In a possible implementation, the disconnected state includes an idle state or an inactive state.

In a possible implementation, before the sending first information to the first network device, the method further includes: establishing a sidelink connection to the second terminal device.

According to a third aspect, an embodiment may provide a communication apparatus. The communication apparatus may be a first network device or may be a chip or a chip system in the first network device. The communication apparatus may include a communication unit. When the communication apparatus is the first network device, the communication unit may be a communication interface or an interface circuit. The communication apparatus may further include a storage unit, and the storage unit may be a memory. The storage unit is configured to store instructions, so that the first network device may implement the communication method described in the first aspect or any one of the possible implementations of the first aspect. When the communication apparatus is the chip or the chip system in the first network device, the communication unit may be a communication interface (for example, an input/output interface, a pin, or a circuit), so that the first network device may implement the communication method described in the first aspect or any one of the possible implementations of the first aspect. The storage unit may be a storage unit in the chip (for example, a register or a cache), or may be a storage unit outside the chip in the first network device (for example, a read-only memory or a random access memory).

For example, the communication unit is configured to send configuration information of a first communication resource to a first terminal device. The first terminal device provides a relay service for a second terminal device, and the first communication resource is used for communication between the first terminal device in a connected state and the first network device; and the communication unit is configured to broadcast, through the first communication resource, a paging message used for paging the second terminal device.

In a possible implementation, the first communication resource includes a second communication resource. The communication unit may be configured to broadcast the paging message through the second communication resource, where the second communication resource is used for receiving data by a terminal device in a disconnected state.

In a possible implementation, the first terminal device is a relay terminal device, and the second terminal device is a remote terminal device.

In a possible implementation, the first communication resource is an active bandwidth part (BWP) and the second communication resource is an initial bandwidth part (BWP).

In a possible implementation, the communication unit may be configured to receive first information from the first terminal device, where the first information indicates that a sidelink connection exists between the first terminal device and the second terminal device.

In a possible implementation, the first information is a dedicated information element.

In a possible implementation, the first information includes identifier information of the second terminal device.

In a possible implementation, the paging message includes a paging message related to the identifier information of the second terminal device.

In a possible implementation, the identifier information of the second terminal device includes a 5G s-temporary mobile subscriber identity (5G-S-TMSI) or a full inactive radio network temporary identifier (full I-RNTI).

In a possible implementation, the disconnected state includes an idle state or an inactive state.

In a possible implementation, the communication unit may be configured to send the identifier information of the second terminal device to a second network device. The second network device is a target network device for handover of the first terminal device.

According to a fourth aspect, an embodiment may provide a communication apparatus. The communication apparatus may be a first terminal device or may be a chip or a chip system in the first terminal device. The communication apparatus may include a processing unit and a communication unit. When the communication apparatus is a network device, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the first terminal device may implement the communication method described in the second aspect or any one of the possible implementations of the second aspect. When the communication apparatus is a chip or a chip system in the first terminal device, the processing unit may be a processor, and the communication unit may be a communication interface. For example, the communication interface may be an input/output interface, a pin, or a circuit. The processing unit executes the instruction stored in the storage unit, so that the first terminal device may implement the communication method described in the second aspect or any one of the possible implementations of the second aspect. The storage unit may be a storage unit (for example, a register or a cache) in the chip, or may be a storage unit outside the chip in the first terminal device (for example, a read-only memory or a random access memory).

For example, the communication unit is configured to receive configuration information of a first communication resource from a first network device, where the first terminal device provides a relay service for a second terminal device, and the first communication resource is used for communication between the first terminal device in a connected state and the first network device; the processing unit is configured to configure the first communication resource based on the configuration information; and the communication unit is configured to receive a paging message based on the first communication resource, where the paging message is used for paging the second terminal device.

In a possible implementation, the first communication resource includes a second communication resource. The communication unit may be configured to receive the paging message based on the second communication resource, and the second communication resource is used for receiving data by a terminal device in a disconnected state.

In a possible implementation, the first terminal device is a relay terminal device, and the second terminal device is a remote terminal device.

In a possible implementation, the first communication resource is an active bandwidth part (BWP) and the second communication resource is an initial bandwidth part (BWP).

In a possible implementation, the communication unit may be configured to send first information to the first network device, where the first information indicates that a sidelink connection exists between the first terminal device and the second terminal device.

In a possible implementation, the first information is a dedicated information element.

In a possible implementation, the first information includes identifier information of the second terminal device.

In a possible implementation, the paging message includes a paging message related to the identifier information of the second terminal device.

In a possible implementation, the identifier information of the second terminal device includes a 5G s-temporary mobile subscriber identity (5G-S-TMSI) or a full inactive radio network temporary identifier (full I-RNTI).

In a possible implementation, the communication unit may be configured to send the paging message to the second terminal device, or the communication unit may be configured to send second indication information to the second terminal device, where the second indication information indicates that the second terminal device is paged.

In a possible implementation, the disconnected state includes an idle state or an inactive state.

In a possible implementation, the processing unit may be configured to establish a sidelink connection to the second terminal device.

According to a fifth aspect, an embodiment may provide a non-transitory computer-readable storage medium, where the non-transitory computer-readable storage medium stores a computer program or instructions. When the computer program or the instructions are run on a computer, the computer is enabled to perform the communication method described in any one of the implementations of the first aspect and the second aspect.

According to a sixth aspect, an embodiment may provide a computer program product including instructions. When the instructions are run on a computer, the computer is enabled to perform the communication method described in any one of the implementation of the first aspect and the second aspect.

According to a seventh aspect, an embodiment may provide a communication system. The system includes any one or more of the following: the communication apparatus described in the third aspect and any of the possible implementations of the third aspect, and the communication apparatus described in the fourth aspect and any of the possible implementations of the fourth aspect.

According to an eighth aspect, an embodiment may provide a communication apparatus. The apparatus includes a processor and a storage medium, the storage medium stores instructions. When the instructions are run by the processor, the communication method described in any implementations of the first aspect and the second aspect is implemented.

According to a ninth aspect, an embodiment may provide a chip or a chip system. The chip or the chip system includes at least one processor and a communication interface, the communication interface and the at least one processor are interconnected by a line. The at least one processor is configured to run a computer program or instructions to perform the communication method described in any one of the implementations of the first aspect and the second aspect. The communication interface in the chip may be an input/output interface, a pin, a circuit, or the like.

In a possible implementation, the chip or the chip system described above further includes at least one memory, and the at least one memory stores instructions. The memory may be a storage unit inside the chip, for example, a register or a cache, or may be a storage unit of the chip (for example, a read-only memory or a random access memory).

It should be understood that the second aspect to the ninth aspect may correspond to the first aspect, and beneficial effects achieved by the aspects and corresponding implementations are similar. Details are not described again.

DETAILED DESCRIPTION OF THE EMBODIMENTS

To clearly describe the embodiments, words such as "first" and "second" are used to distinguish same items or similar items that may have the same functions and effects in embodiments. For example, first information and second information are merely used to distinguish different information, and a sequence of the first information and the second information is not limited. A person skilled in the art may understand that the words "first" and "second" do not limit a quantity and an execution sequence, and the words "first" and "second" are not necessarily different.

It should be noted that in the embodiments, words such as "example" or "for example" are used to represent an example, an instance, or a description. The use of the words "example" or "for example" is intended to present the related concept in a concrete manner.

In the embodiments, "at least one" refers to one or more, and "a plurality of" refers to two or more. "And/or" describes an association relationship of associated objects and indicates that three relationships may exist. For example, A and/or B may indicate that only A exists, both A and B exist, and only B exists, where A and B may be singular or plural. The character "/" generally indicates that the associated objects are in an OR relationship. "At least one of the following" or a similar expression thereof refers to any combination of these items, including any combination of a single item or a plural item. For example, at least one of a, b, or c may represent: a, b, c, a-b, a-c, b-c, or a-b-c, where a, b, and c may be one or more.

The 3rd generation partnership project (3GPP) International Organization for Standardization introduces a D2D technology in a long term evolution (LTE) release R12, to support direct communication between two terminal devices.

The R12 D2D technology is oriented to public safety, including a D2D communication and a D2D discovery. The R12 D2D communication is oriented to public security and may support one-to-many communication. The R12 D2D discovery supports simple commercial broadcast (for example, advertisement and broadcast).

Figures 1, 2:
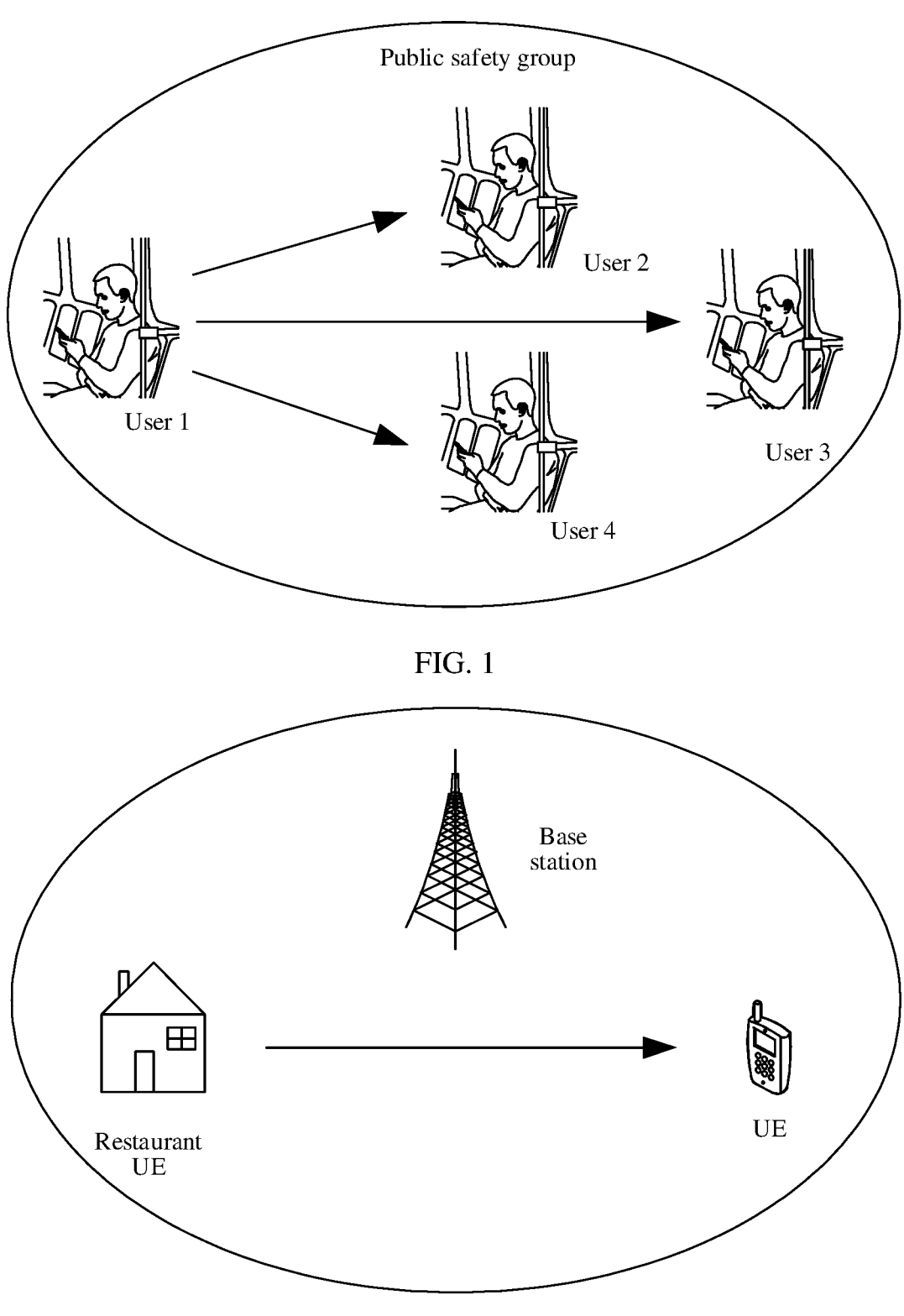
FIG. 1 is a schematic diagram of a device-to-device (D2D) communication according to an embodiment.
FIG. 2 is a schematic diagram of a D2D discovery according to an embodiment.

For example, FIG. 1 is a schematic diagram of a D2D communication according to an embodiment. As shown in FIG. 1, within a public safety group range, a user 1 may perform data sharing or interactive a game interaction with a user 2, a user 3, and/or a user 4 through a D2D communication function.

For example, FIG. 2 is a schematic diagram of a D2D discovery according to an embodiment. As shown in FIG. 2, within a communication coverage area of a base station, user equipment (UE) (or referred to as a terminal device or a terminal) in a restaurant may launch an advertisement or discount information to UE in a neighboring area through a D2D discovery function.

Further, the 3GPP International Standardization Organization enhances a D2D technology in an LTE release (R13), so that the D2D technology can support one-to-one communication. To expand network coverage, the D2D technology may also support a U2N relay scenario.

Further, the 3GPP International Standardization Organization mentions a U2N relay of a wearable device in an LTE release (R15), and 3GPP R15 may support an L2 relay.

Figure 3:
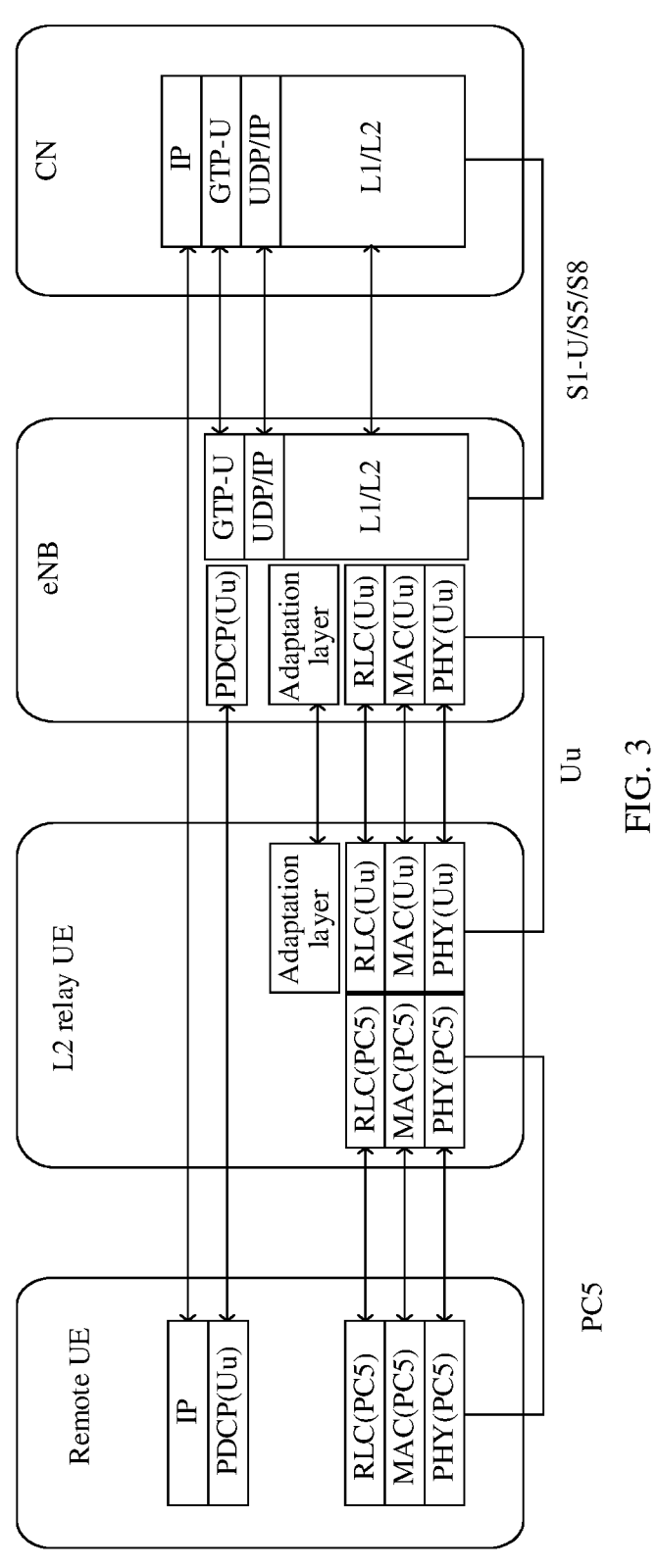
FIG. 3 is a schematic diagram of a user plane radio protocol stack for L2 evolved U2N relay according to an embodiment.

For example, FIG. 3 is a schematic diagram of a user plane radio protocol stack for L2 evolved U2N relay according to an embodiment. As shown in FIG. 3, a packet data convergence protocol (PDCP) is transparently transmitted by L2 relay UE, and the L2 relay UE may assist remote UE in establishing a radio resource control (RRC) connection to a base station.

In a possible implementation, a user plane radio protocol stack for the remote UE includes an internet protocol (IP) layer, a PDCP layer, a radio link control (RLC) layer, a media access control (MAC) layer and a physical (PHY) layer.

In a possible implementation, a user plane radio protocol stack for the L2 relay UE includes an RLC layer, a MAC layer, a PHY layer, and an adaptation layer.

In a possible implementation, a user plane radio protocol stack for the base station (eNB) includes a PDCP layer, an adaptation layer, an RLC layer, a MAC layer, a PHY layer, a general packet radio service tunneling protocol user (GTP-U) layer, a user datagram protocol (UDP)/IP layer, and a layer 1 (L1)/L2.

The adaptation layer is located in an LTE/new radio (new radio, NR) of the relay UE and the base station, and an objective of the adaptation layer is to carry an identifier of the remote UE and a signalling radio bearer (SRB)/data radio bearer (data radio bearer, DRB) identifier of the remote UE; or to carry an identifier of the remote UE and an identifier of an SL/PC5 interface between the relay UE and the remote UE during an RRC message transmission or a data transmission process.

In a possible implementation, a user plane radio protocol stack for a core network (core network, CN) includes an IP layer, a GTP-U layer, a UDP/IP layer, and an L1/L2.

In a possible implementation, the remote UE communicates with the relay UE by a PC5 interface, and the relay UE communicates with the base station by a Uu interface. The Uu interface may be used for an uplink and a downlink. The base station communicates with the CN by an S1-U/S5/S8 interface. The S1-U/S5/S8 interface may be used for long-distance communication between the CN and remote UE.

Figure 4:
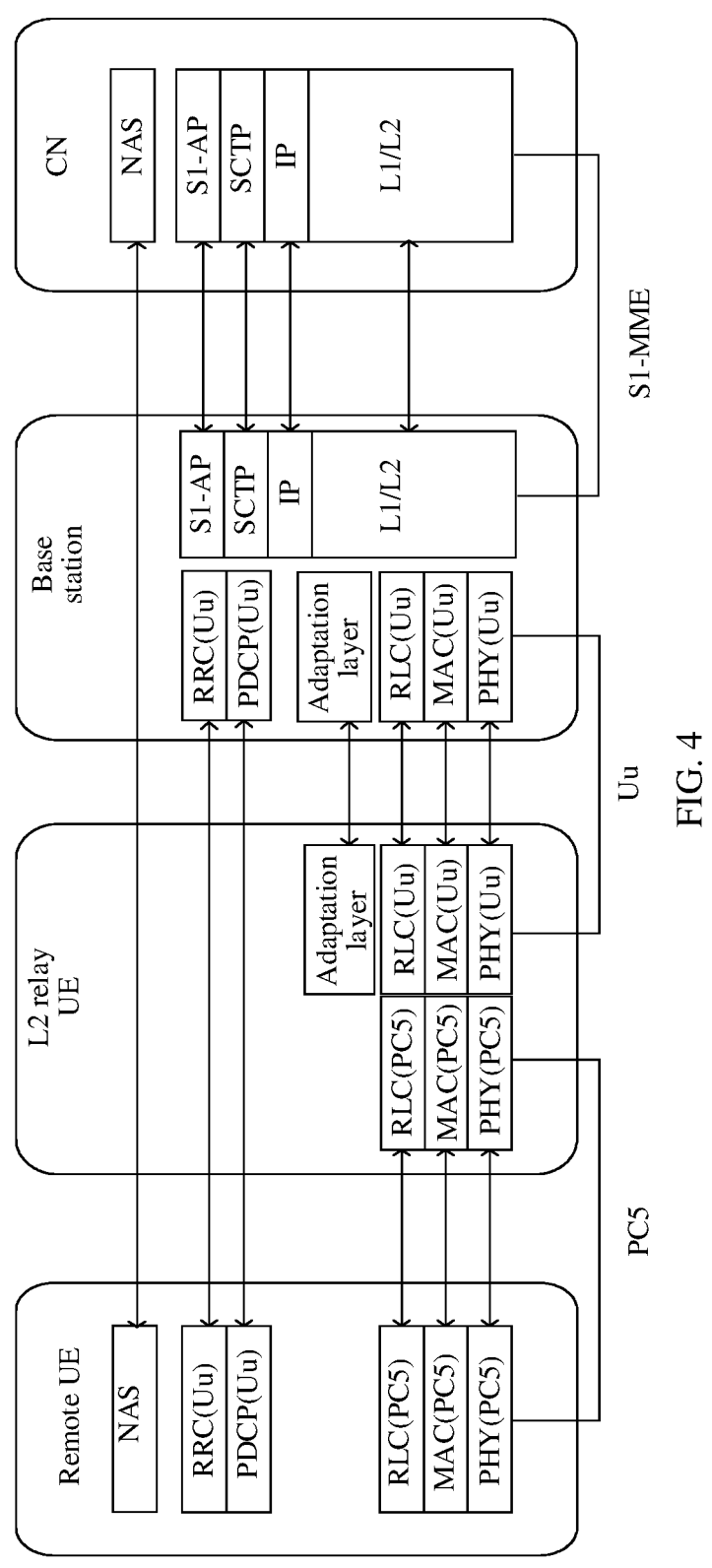
FIG. 4 is a schematic diagram of a control plane radio protocol stack for L2 evolved U2N relay according to an embodiment.

For example, FIG. 4 is a schematic diagram of a control plane radio protocol stack for L2 evolved U2N relay according to an embodiment. As shown in FIG. 4, a PDCP layer and an RRC layer are transparently transmitted by relay UE. Remote UE may establish an RRC connection to a base station by assistance of the relay UE.

In a possible implementation, a control plane radio protocol stack for the remote UE includes a non-access stratum (NAS), an RRC layer, a PDCP layer, an RLC layer, a MAC layer, and a PHY layer.

In a possible implementation, a control plane radio protocol stack for the L2 relay UE includes an RLC layer, a MAC layer, a PHY layer, and an adaptation layer.

The adaptation layer is located in an LTE/new radio (NR) of the relay UE and the base station, and an objective of the adaptation layer is to carry an identifier of the remote UE and a signalling radio bearer (SRB)/data radio bearer (data radio bearer, DRB) identifier of the remote UE; or to carry an identifier of the remote UE and an identifier of an SL/PC5 interface between the relay UE and the remote UE during an RRC message transmission or a data transmission process.

In a possible implementation, a control plane radio protocol stack for the base station (eNB) includes an RRC layer, a PDCP layer, an adaptation layer, an RLC layer, a MAC layer, a PHY layer, an S1 application protocol (S1-AP) layer, a stream control transmission protocol (SCTP) layer, an IP layer, and an L1/L2.

In a possible implementation, a control plane radio protocol stack for a core network (CN) includes a NAS layer, an S1-AP layer, an SCTP layer, an IP layer, and an L1/L2.

In a possible implementation, the remote UE communicates with the relay UE by a PC5 interface, and the relay UE communicates with the base station by a Uu interface. The Uu interface may be used for an uplink and a downlink. The base station communicates with the CN by an S1-MME interface, and the S1-MME interface is used to transmit session management (SM) and mobility management (MM) information.

With gradual improvement and development of communication technologies, a D2D communication and cooperative communication between UEs are introduced in a 5th generation new radio (5G NR) technology in a 3GPP standard. In addition to being used for public security, improvement of network system performance is considered for the D2D communication and cooperative communication between UEs in the 5G NR technology. The network system performance may include network coverage and capacity.

Figure 5:
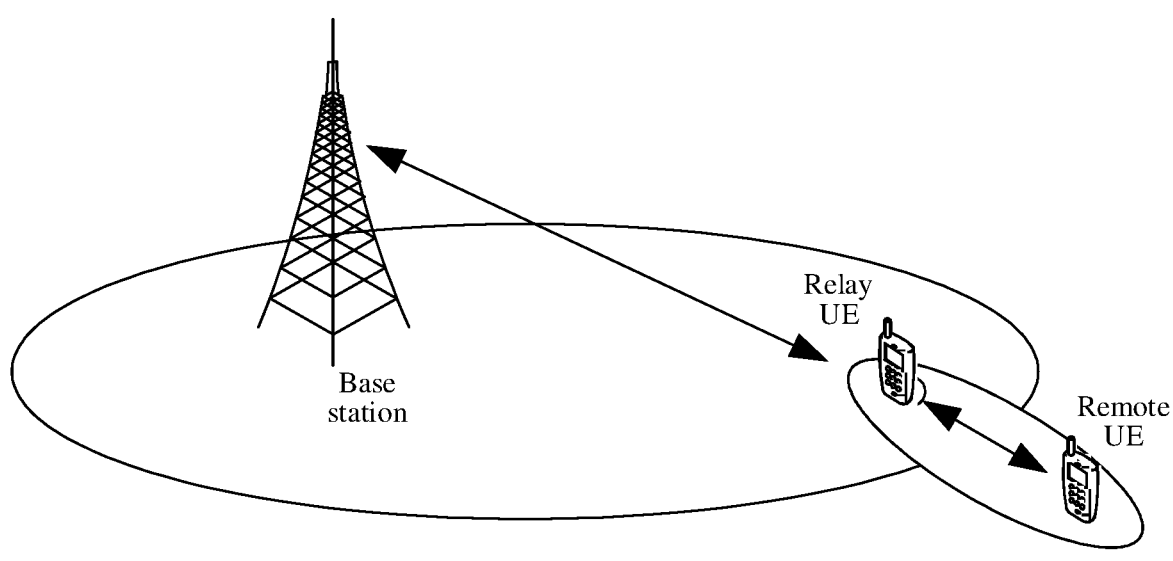
FIG. 5 is a schematic diagram of a U2N relay scenario according to an embodiment.

For example, FIG. 5 is a schematic diagram of a U2N relay scenario according to an embodiment. As shown in FIG. 5, the scenario may include a base station, relay UE, and remote UE. The base station and the relay UE may communicate in any of the foregoing possible manners, and the relay UE and the remote UE may communicate through a sidelink (SL) or the like.

In an uplink scenario, when the remote UE needs to send data to the base station, the remote UE may send the data to the relay UE, and the relay UE forwards the data received from the remote UE to the base station.

In a downlink scenario, when the base station needs to send data to the remote UE, the base station may send the data to the relay UE, and the relay UE forwards the data received from the base station to the remote UE.

It may be understood that, even if the remote UE is not in a network coverage area of the base station, the network coverage area of the base station may be extended to an area of the remote UE due to cooperative communication of the relay UE, to extend the network coverage area.

In a possible case, when the remote UE is in an idle state or inactive state, a connection between the remote UE and the base station is disconnected, the base station needs to send data or voice to the remote UE, and the base station may find the remote UE through a paging message. After the remote UE receives the paging message, the remote UE may establish a connection to the base station by assistance of the relay UE, to perform data transmission or voice transmission. Alternatively, after the remote UE receives the paging message, the remote UE may trigger an initial connection establishment based on the paging message.

In a U2N L2 relay communication scenario, a manner of paging by the base station through a Uu interface may include CN paging and radio access network (RAN) paging.

In a possible manner, when the UE is in the idle state, paging initiated by a CN to the UE is CN paging, and the CN paging is performed based on a tracking area (TA).

For example, CN paging is initiated by an access and mobility management function (AMF) network element, and the AMF network element sends a paging message to a base station included in a tracking area identity (TAI) list, the base station finds a cell broadcast paging message related to the base station in the TAI list, and UE that listens to the paging message checks whether the paging message contains an identifier (ID) of the base station. If the UE has the ID of the UE, the UE initiates an RRC establishment request to connect to the base station. If the UE does not have the ID of the UE, the UE ignores the paging request.

In another possible manner, when the UE is in the inactive state, paging initiated by the base station side is RAN paging, and the RAN paging is performed based on a RAN.

For example, the RAN paging is initiated by a last serving base station before the UE switches to the inactive state from a connected state, and the UE switched to the inactive state is not perceived by the AMF network element side. On the AMF network element side, the UE is still in the connected state, and the UE continues to send data to the last serving base station. The last serving base station cannot find the UE and sends a paging message to a base station included in a radio access network area code (RANAC) list, and the base station finds a cell broadcast paging message related to the base station in a RAN paging area. UE that listens to the paging message checks whether the paging message contains an ID of the base station. If the UE has the ID of the UE, the UE initiates an RRC establishment request to connect to the base station. If the UE does not have the ID of the UE, the UE ignores the paging request.

In this embodiment, paging in a Uu technology in time domain may be understood as: UE in the idle state or inactive state chooses to "wake up" in a proper time period to receive a paging message. A frequency domain resource occupied by the paging message is specified by a physical downlink control channel (PDCCH) scrambled by a paging radio network temporary identity (P-RNTI).

In the time domain, the UE attempts to receive a paging message on a paging occasion (PO) of a paging frame (PF) in a paging cycle. The UE stays in a sleep state in another time period, to reduce power consumption of the UE and prolong a service life of a battery of the UE. However, the base station needs to send the paging message through an air interface at this moment, so that the UE can receive the paging message at this moment.

For example, Table 1 is a name of each parameter and content described by each parameter. As shown in Table 1, a system frame number (SFN) indicates a current frame number in which data is sent. T is a discontinuous reception (DRX) cycle, and T may be a minimum value between a DRX, referred to as the paging cycle, and a default DRX. If the UE is not configured with the paging cycle, the UE can use the default DRX. N is the number of PF included in T, Ns is the number of POs included in each PF, PF_offset is an offset of the PF, and UE_ID is a result of a modulo operation of a 5G s-temporary mobile subscriber identity (5G-S-TMSI) and 1024.

TABLE 1

| Parameter | Description |
| --- | --- |
| SFN | System frame number |
| T | DRX cycle, min (paging cycle, default DRX) |
| N | Number of PF included in T |
| Ns | Number of PO included in each PF |
| PF_offset | PF offset |
| UE_ID | 5G-S-TMSI mod 1024 |

In a possible manner, the PF is the system frame, and the PF meets the following formula:

$$(\text{SFN}+PF\_\text{offset})\bmod T=(T \text{ div } N)*(\text{UE\_ID} \bmod N).$$

In a possible manner, the PO are indicated through an index i_s, and the i_s meets the following formula:

$$i\_s=\text{floor}(\text{UE\_ID}/N)\bmod Ns.$$

The mod represents a modulo operation, and the div represents an exact division operation.

In a possible manner, for the CN paging, the paging cycle may be configured through a NAS signaling, and the default DRX may be configured through an information element (IE) of a system information block type1 (SIB1). This IE is a default paging DRX in a paging control channel (PCCH) configuration.

In a possible manner, for the RAN paging, the paging cycle may be configured through an RRC release signaling.

The base station may learn of the ID of the UE and the UE may learn of the DRX cycle, N, Ns, and PF_offset of a serving cell in which the UE is located. In this way, both the base station and the UE may learn of the PF/PO. Therefore, the base station may broadcast the paging message on the PF/PO, and the UE may listen to the paging message on the PF/PO.

Figure 6:
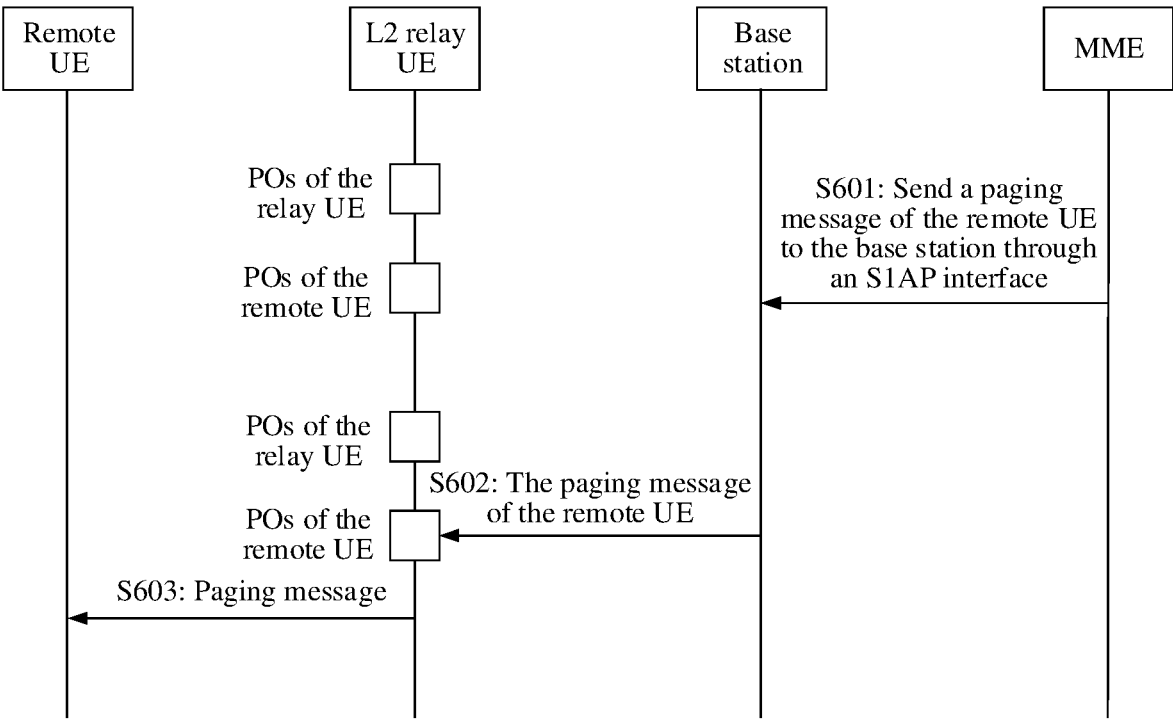
FIG. 6 is a schematic flowchart of monitoring a paging message by relay UE according to an embodiment.

In a possible manner, relay UE may listen to a paging message on a PO of a PF of remote UE. For example, FIG. 6 is a schematic flowchart of monitoring a paging message by relay UE according to an embodiment.

S601: A mobility management entity (MME) sends a paging message of the remote UE to a base station through an S1AP interface.

S602: The base station broadcasts the paging message of the remote UE over an air interface through the PF/PO of the remote UE.

S603: The relay UE listens to the paging message of the remote UE on the PF/PO of the remote UE and sends the paging message to the remote UE through a PC5 interface if it is determined that the remote UE is paged.

In this embodiment, the relay UE receives the paging message sent by the base station, the remote UE notifies the relay UE of an ID of the relay UE, and the relay UE learns of the PF/PO of the remote UE. Therefore, the relay UE may listen to the paging message of the remote UE on the PF/PO of the remote UE, the relay UE decodes the paging message and identifies the ID of the remote UE, and the relay UE and the remote UE establish a paging channel on a short-distance link. The relay UE forwards the paging message to the remote UE by using the paging channel through the PC5 interface.

Figure 7:
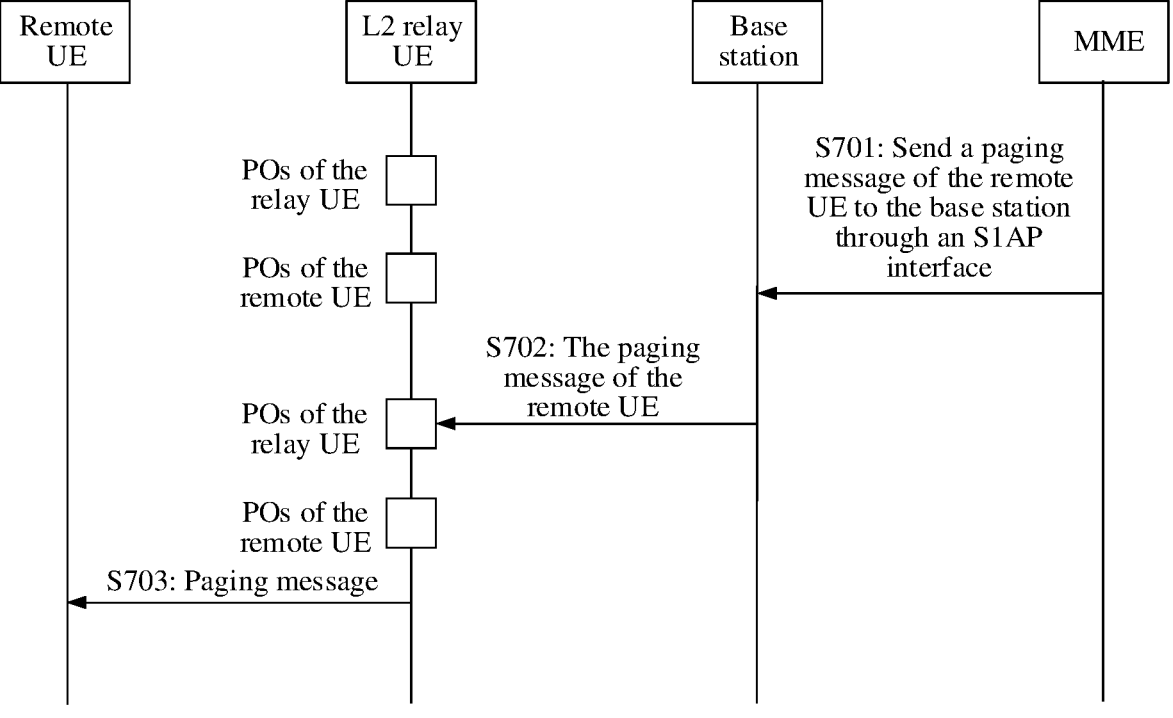
FIG. 7 is a schematic flowchart of monitoring a paging message by relay UE according to an embodiment.

In a possible manner, relay UE may monitor a paging message on a PO of a PF of the relay UE. For example, FIG. 7 is a schematic flowchart of monitoring a paging message by relay UE according to an embodiment.

S701: An MME sends a paging message of remote UE to a base station through an S1AP interface.

S702: The base station broadcasts the paging message of the remote UE over an air interface through the PF/PO of the relay UE.

S703: The relay UE listens to the paging message of the remote UE on the PF/PO of the relay UE and sends the paging message to the remote UE through a PC5 interface if it is determined that the remote UE is paged.

In a possible manner, the relay UE receives the paging message sent by the base station, the remote UE notifies the relay UE of an ID of the remote UE, and the CN learns of a connection relationship between the remote UE and the relay UE. The CN instructs the base station to broadcast the paging message of the remote UE on the PF/PO of the relay UE, so that the relay UE may listen to the paging message of the remote UE on the PF/PO of the relay UE, and the relay UE decodes the paging message and identifies the ID of the remote UE. The relay UE and the remote UE establish a paging channel on a short-distance link, and the relay UE forwards the paging message to the remote UE by using the paging channel through the PC5 interface.

In this embodiment, paging in a Uu technology in frequency domain may be understood as: The base station broadcasts a paging message and a short message on an initial bandwidth part (initial BWP), and broadcasts the short message in another dedicated BWP (for example, an active BWP).

For example, the initial BWP is activated for UE in an idle state or an inactive state. The base station may broadcast a paging message on the initial BWP, and the UE may listen to the paging message and short message on the initial BWP, to ensure that the UE in the idle state or inactive state is correctly paged. Another dedicated bandwidth part (BWP) is activated for UE in a connected state, and the UE may listen to the short message, but cannot listen to the paging message.

In a possible case, in a process in which the relay UE assists the remote UE in establishing a connection to the base station, the active BWP is activated for the relay UE in the connected state, and a frequency domain range of the active BWP is different from a frequency domain range of the initial BWP, so that the relay UE cannot listen to the paging message of the remote UE.

Figure 8:
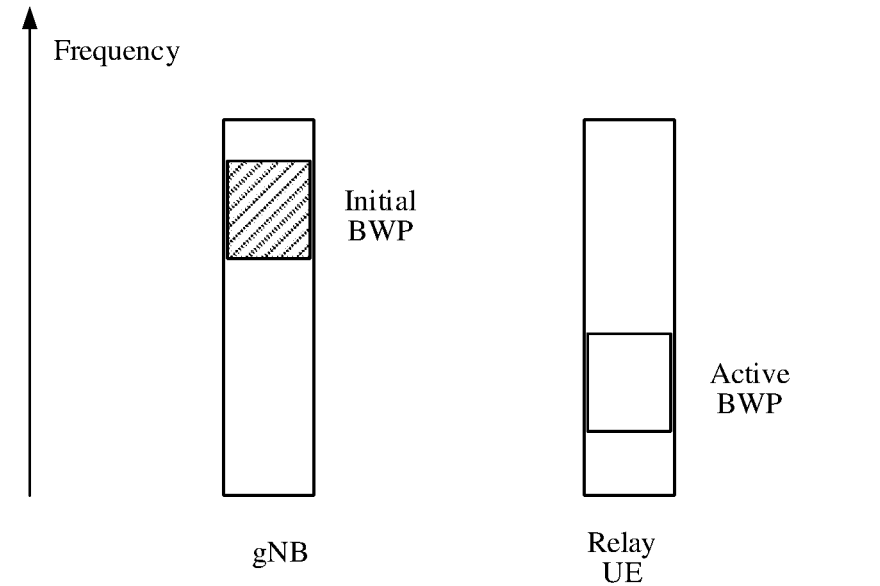
FIG. 8 is a schematic diagram of a frequency domain range of an initial BWP and an active BWP according to an embodiment.

For example, FIG. 8 is a schematic diagram of a frequency domain range of an initial BWP and an active BWP according to an embodiment. As shown in FIG. 8, a base station (gNB) broadcasts a paging message on the initial BWP. Relay UE in a connected state is activated the active BWP, and frequency domain ranges of the initial BWP and the active BWP are different. Therefore, the relay UE in the connected state cannot listen to the paging message, and a requirement of monitoring the paging message for remote UE cannot be met.

A manner in which the relay UE listens to a paging message of the remote UE on the PF/POs is used for resolving a paging problem in a time domain but cannot resolve a paging problem in a frequency domain. The base station broadcasts the paging message on the initial BWP. As a result, only relay UE in an idle state or inactive state can listen to the paging message of the remote UE, and the relay UE in the connected state cannot listen to the paging message of the remote UE.

Based on this, an embodiment may provide a communication method and apparatus. A first network device sends configuration information of a first communication resource to a first terminal device. The first terminal device may configure the first communication resource based on the received configuration information. The first terminal device may listen to a paging message broadcast by the first network device on the first communication resource, so that the first terminal device in the connected state can listen to a paging message for a second terminal device, and the second terminal device can establish a communication connection to the first network device.

The method in the embodiment may be applied to a 5G NR U2N relay communication scenario or may be applied to an LTE U2N relay communication scenario. Alternatively, the method may be applied to a communication scenario in which one device provides a service for another device.

The first network device described in the embodiment may be an access network device connected to an evolved packet core (EPC) or a 5G generation core (NGC). For example, the first network device may be an eNB, a gNB, or an eLTE eNB.

The first terminal device described in the embodiment may be a mobile phone, a tablet computer, a portable notebook computer, a virtual/hybrid/enhanced reality device, a navigation device, a session initiation protocol (SIP) phone, a wireless local loop (WLL) station, a personal digital assistant (PDA), a handheld device with satellite communication capability, a computing device or another processing device connected to a wireless modem, a vehicle-mounted device, a wearable device, a terminal device in a 5G network, a future evolved public land mobile network (PLMN), or a terminal device in another future communication system, or the like.

The following describes in detail how the embodiment may resolve the foregoing problems. The following embodiments may be implemented independently or may be combined with each other. A same or similar concept or process may not be described again in some embodiments.

Figures 9, 10:
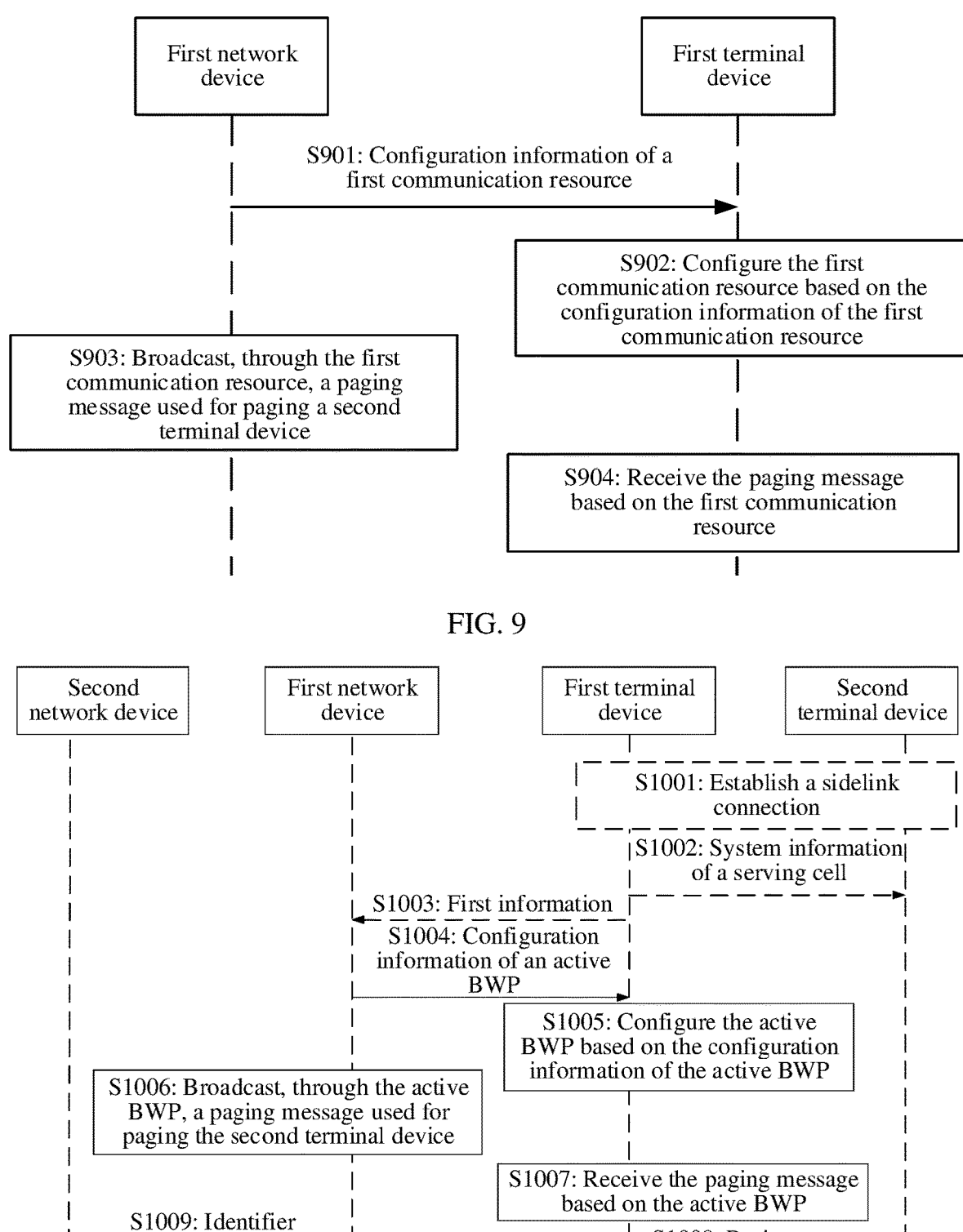
FIG. 9 is a schematic flowchart of a communication method according to an embodiment.
FIG. 10 is a schematic flowchart of a communication method according to an embodiment.

FIG. 9 is a schematic flowchart of a communication method according to an embodiment. The communication method may include the following steps:

S901: A first network device sends configuration information of a first communication resource to a first terminal device.

In this embodiment, the first communication resource is used for communication between the first terminal device in a connected state and the first network device.

For example, the first terminal device may receive a paging message from the first network device through the first communication resource, so that the first terminal device can assist a second terminal device in establishing a connection to the first network device. The first terminal device may be a relay terminal device, the second terminal device may be a remote terminal device, and the first terminal device may be configured to provide a relay service for the second terminal device. The relay service may be understood as that the first terminal device receives data of the second terminal device, and forwards the data to the first network device, so that the second terminal device can send the data to the first network device; and/or the first terminal device receives data of the first network device, and forwards the data to the second terminal device, so that the first network device can send the data to the second terminal device. Alternatively, a base station may send data to the second terminal device based on the first terminal device, so that the first network device can send the data to the second terminal device.

In a possible implementation, the first communication resource includes a time domain resource or a frequency domain resource. The time domain resource may include a start time, duration, or a periodicity, and the frequency domain resource may include a start carrier or a bandwidth size.

In this embodiment, the first communication resource may be in a form of a carrier, a BWP, a resource pool, a subchannel, a subcarrier, a frame number, a subframe number, or the like. It may be understood that content of the form of the first communication resource may alternatively be set based on an actual application scenario. This is not limited in this embodiment.

In this embodiment, the configuration information of the first communication resource is used for configuring the first communication resource by the first terminal device, so that the first terminal device in the connected state can communicate based on the first communication resource. For example, the configuration information of the first communication resource may include a frequency domain size of the first communication resource, a start position of the first communication resource, or the like. It may be understood that content of the configuration information of the first communication resource may be set based on an actual application scenario. This is not limited in this embodiment.

S902: The first terminal device configures the first communication resource based on the configuration information of the first communication resource.

In this embodiment, the first terminal device may set a frequency domain range of the first communication resource based on the configuration information of the first communication resource. It may be understood that a range of the frequency domain range of the first communication resource may be set based on an actual application scenario. This is not limited in this embodiment.

S903: The first network device broadcasts, through the first communication resource, a paging message used for paging the second terminal device.

In this embodiment, the second terminal device is in a disconnected state, and the disconnected state may include an idle state or an inactive state. For example, when the second terminal device is in the disconnected state, and communication between the second terminal device and the first network device is disconnected, the first network device may find the second terminal device through the paging message, so that the first network device establishes a communication connection to the second terminal device.

In this embodiment, the first network device broadcasts the paging message through the first communication resource may be understood as that the first network device broadcasts the paging message by using the first communication resource, or the first network device broadcasts the paging message on the first communication resource.

For example, after the first network device receives the paging message from a core network, or after receiving the paging message from an anchor base station (anchor gNB), or after the first network device triggers a paging mechanism for the anchor base station, the first network device broadcasts the paging message in a bandwidth range of the first communication resource, so that the first terminal device in the connected state can continue to listen to the paging message. It may be understood that an implementation of broadcasting the paging message by the first network device may be set based on an actual application scenario. This is not limited in this embodiment.

In this embodiment, the first network device may broadcast the paging message through a PF/PO in the time domain based on the first communication resource. For example, the first network device calculates the PF/PO of the paging message of the second terminal device in the time domain based on identifier information of the second terminal device, and the first network device broadcasts the paging message on a PF/PO of the second terminal device. A manner of which the first network device calculates the PF/PO has been described in the foregoing formula, and details are not described herein again. For another example, when the first network perceives an association relationship between the first terminal device and the second terminal device, the first network device may further broadcast the paging message of the second terminal device on a PF/PO of the first terminal device.

In this embodiment, the first network device may send the paging message to the first terminal device. For example, the first network device sends an RRC message to the first terminal device, where the RRC message includes the paging message.

S904: The first terminal device receives the paging message based on the first communication resource.

In this embodiment, the first terminal device may receive the paging message based on the first communication resource in the frequency domain. For example, the first terminal device listens to the paging message in the frequency domain range of the first communication resource. It may be understood that an implementation of receiving the paging message by the first terminal device may be set based on an actual application scenario. This is not limited in this embodiment.

In this embodiment, the first terminal device may receive the paging message through the PF/PO in the time domain based on the first communication resource. For example, the first terminal device receives the identifier information of the second terminal device and calculates the PF/PO of the second terminal device. The first terminal device may listen to the paging message of the second terminal device on the PF/PO of the second terminal device. For another example, when the first network device broadcasts the paging message of the second terminal device on the PF/PO of the first terminal device, the first terminal device may listen to the paging message of the second terminal device through the PF/PO of the first terminal device. When the first terminal device parses the paging message and determines that the second network device is paged, the first terminal device may broadcast the paging message on a PC5 interface to notify the second terminal device that the second terminal device is paged. Alternatively, the first terminal device may notify, through a unicast message on the PC5 interface, that the second terminal device is paged.

In this embodiment, the first terminal device receives the paging message, and the first terminal device may assist the second terminal device in establishing an RRC connection to the first network device, so that the second terminal device and the first network device may normally communicate with each other.

In conclusion, the first network device sends the configuration information of the first communication resource to the first terminal device, and the first terminal device may activate the first communication resource based on the configuration information. In this way, when the first network device broadcasts the paging message through the first communication resource, the first terminal device may receive the paging message, so that the first terminal device in the connected state meets a requirement of monitoring a paging message for the second terminal device.

Based on the embodiment corresponding to FIG. 9, the first communication resource includes a BWP. FIG. 10 is a schematic flowchart of a communication method according to an embodiment. An example in which the first communication resource is an active BWP is used for description in this embodiment. For example, a first network device broadcasts a paging message through the active BWP, a first terminal device receives the paging message based on the active BWP, and the first terminal device sends the paging message to a second terminal device. As shown in FIG. 10, the method may include the following steps:

S1001: The first terminal device establishes a sidelink connection to the second terminal device.

In this embodiment, the first terminal device may send a message to the second terminal device through a sidelink, so that the second terminal device can communicate with the first network device based on the message.

S1002: The first terminal device sends a system message of a serving cell to the second terminal device.

In this embodiment, the system message may be a public land mobile network (PLMN) ID and a tracking area code (TAC). The system message may be a PLMN ID, a TAC, and a RAN-based notification area code (RNAC), or may be a PLMN ID and a serving cell ID.

In an example, the first terminal device sends the system message of the serving cell to the second terminal device, or the first terminal device periodically broadcasts the system message of the serving cell to the second terminal device, so that a TAI list or an RNA list of the second terminal device may include the serving cell of the first terminal device, and the first network may page the second terminal device by the first terminal device.

For example, when the second terminal device determines that the TAI list or the RNA list of the second terminal device does not include the TAC, the RNAC, or the serving cell ID of the first terminal device, the second terminal device triggers a tracking area updating (TAU) or a RAN-based notification area update (RNAU), so that the TAI list or the RNA list of the second terminal device may include the TAC, the RNAC, or the serving cell ID of the first terminal device.

S1003: The first network device receives first information from the first terminal device.

In this embodiment, the first information indicates that the sidelink connection exists between the first terminal device and the second terminal device. For example, the first information may be a dedicated information element, and the dedicated information element may be understood as dedicated signaling or dedicated information. The dedicated information element may carry information indicating that the sidelink connection exists between the first terminal device and the second terminal device.

In this embodiment, the first information may include identifier information of the second terminal device. The first information may include identifier information of the second terminal device in a disconnected state, and the disconnected state includes an idle state or an inactive state.

For example, the identifier information of the second terminal device may be a 5G s-temporary mobile subscriber identity or a full inactive radio network temporary identifier (full I-RNTI), or the identifier information of the second terminal device may be another identifier that may be used to identify the second terminal device. In other words, content of the identifier information of the second terminal device may be set based on an actual application scenario. This is not limited in this embodiment.

S1004: The first network device sends configuration information of the active BWP to the first terminal device.

S1005: The first terminal device configures the active BWP based on the configuration information of the active BWP.

S1006: The first network device broadcasts, through the active BWP, a paging message used for paging the second terminal device.

S1007: The first terminal device receives the paging message based on the active BWP.

S1008: The first terminal device sends the paging information to the second terminal device.

In this embodiment, the first terminal device receives the paging message, and the first terminal device parses the paging message to identify an ID of the second terminal device, so that the first terminal device may send the paging message to the second terminal device through a PC5 interface. In this way, the second terminal device may establish an RRC connection to the first network device based in the paging message, so that the second terminal device and the first network device may normally communicate with each other.

S1009: The first network device sends the identifier information of the second terminal device to a second network device.

In this embodiment, the second network device is a target network device for handover of the first terminal device. For example, after the first terminal device camps on a cell covered by the second network device, in a group handover process, the first network device may send the identifier information of the second terminal device to the second network device. In this way, the second network device may learn of a connection relationship between the first terminal device and the second terminal device.

In this embodiment, after the first terminal device camps on the cell covered by the second network device, the first terminal device may establish the RRC connection to the second network device, and the first terminal device may send the identifier information of the second terminal device, so that the second network device may learn of the connection relationship between the first terminal device and the second terminal device.

In this embodiment, for S1004 to S1007, refer to content adaptation descriptions of S901 to S904. Details are not described herein again.

It should be noted that S1001 to S1003, S1008, and S1009 in this embodiment are optional steps, and one or more of the optional steps may be set based on an actual application scenario. A sequence of the steps in this embodiment may also be adjusted based on an actual application scenario. This is not limited in this embodiment.

In conclusion, the first network device sends the configuration information of the active BWP to the first terminal device, and the first terminal device sets the active BWP based on the configuration information. In this way, the first network device broadcasts the paging message through the active BWP, and the first terminal device may receive the paging message based on the active BWP. The first terminal device may send an information message to the second terminal device, so that the second terminal device establishes the RRC connection to the first network device.

In a possible implementation, the first terminal device may simultaneously activate a plurality of BWPs. When the first terminal device listens to the paging message for the second terminal device, the first terminal device may receive the paging message through the method in this embodiment, and the first terminal device sends the paging message to the second terminal device, so that the second terminal device may establish the RRC connection to the first network device.

Figure 11:
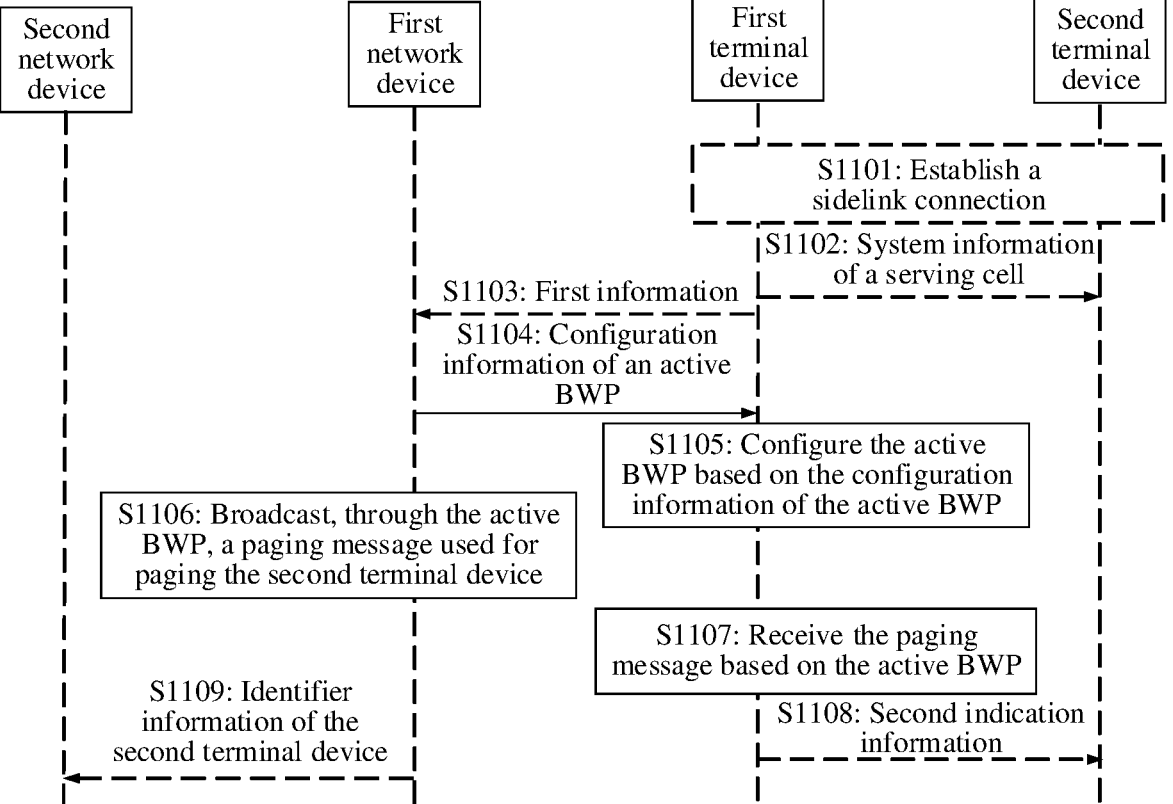
FIG. 11 is a schematic flowchart of a communication method according to an embodiment.

Based on the embodiment corresponding to FIG. 9, the first communication resource includes a BWP. FIG. 11 is a schematic flowchart of a communication method according to an embodiment. This embodiment is described through an example in which a first communication resource is an active BWP. For example, a first network device broadcasts a paging message on the active BWP, a first terminal device receives the paging message on the active BWP, and the first terminal device sends second indication information to a second terminal device. As shown in FIG. 11, the method may include the following steps:

S1101: The first terminal device establishes a sidelink connection to the second terminal device.

S1102: The first terminal device sends a system message of a serving cell to the second terminal device.

S1103: The first network device receives first information from the first terminal device.

S1104: The first network device sends configuration information of the active BWP to the first terminal device.

S1105: The first terminal device configures the active BWP based on the configuration information of the active BWP.

S1106: The first network device broadcasts, through the active BWP, a paging message used for paging the second terminal device.

S1107: The first terminal device receives the paging message based on the active BWP.

S1108: The first terminal device sends the second indication information to the second terminal device.

In this embodiment, the second indication information indicates that the second terminal device is paged. In this way, the second terminal device may establish an RRC connection to the first network device based on the second indication information, so that a second network device and the second terminal device may normally communicate with each other.

S1109: The first network device sends identifier information of the second terminal device to the second network device.

In this embodiment, for S1101 to S1103 and S1109, refer to content adaptation descriptions of S1001 to S1003 and S1009. For S1104 to S1107, refer to content adaptation descriptions of S901 to S904. Details are not described herein again.

It should be noted that S1101 to S1103, S1108, and S1109 in this embodiment are optional steps, and one or more of the optional steps may be set based on an actual application scenario. A sequence of the steps in this embodiment may also be adjusted based on an actual application scenario. This is not limited in this embodiment.

In conclusion, the first network device sends the configuration information of the active BWP to the first terminal device, and the first terminal device configures the active BWP based on the configuration information. In this way, the first network device broadcasts the paging message through the active BWP, and the first terminal device may receive the paging message based on the active BWP. The first terminal device may send the second indication information to the second terminal device, so that the second terminal device can establish the RRC connection to the first network device based on the second indication information, and the second network device and the second terminal device may normally communicate with each other.

In a possible implementation, the first terminal device may simultaneously activate a plurality of BWPs. When the first terminal device listens to the paging message for the second terminal device, the first terminal device may receive the paging message through the method in this embodiment, and the first terminal device sends the paging message to the second terminal device, so that the second terminal device may establish the RRC connection to the first network device.

Figure 12:
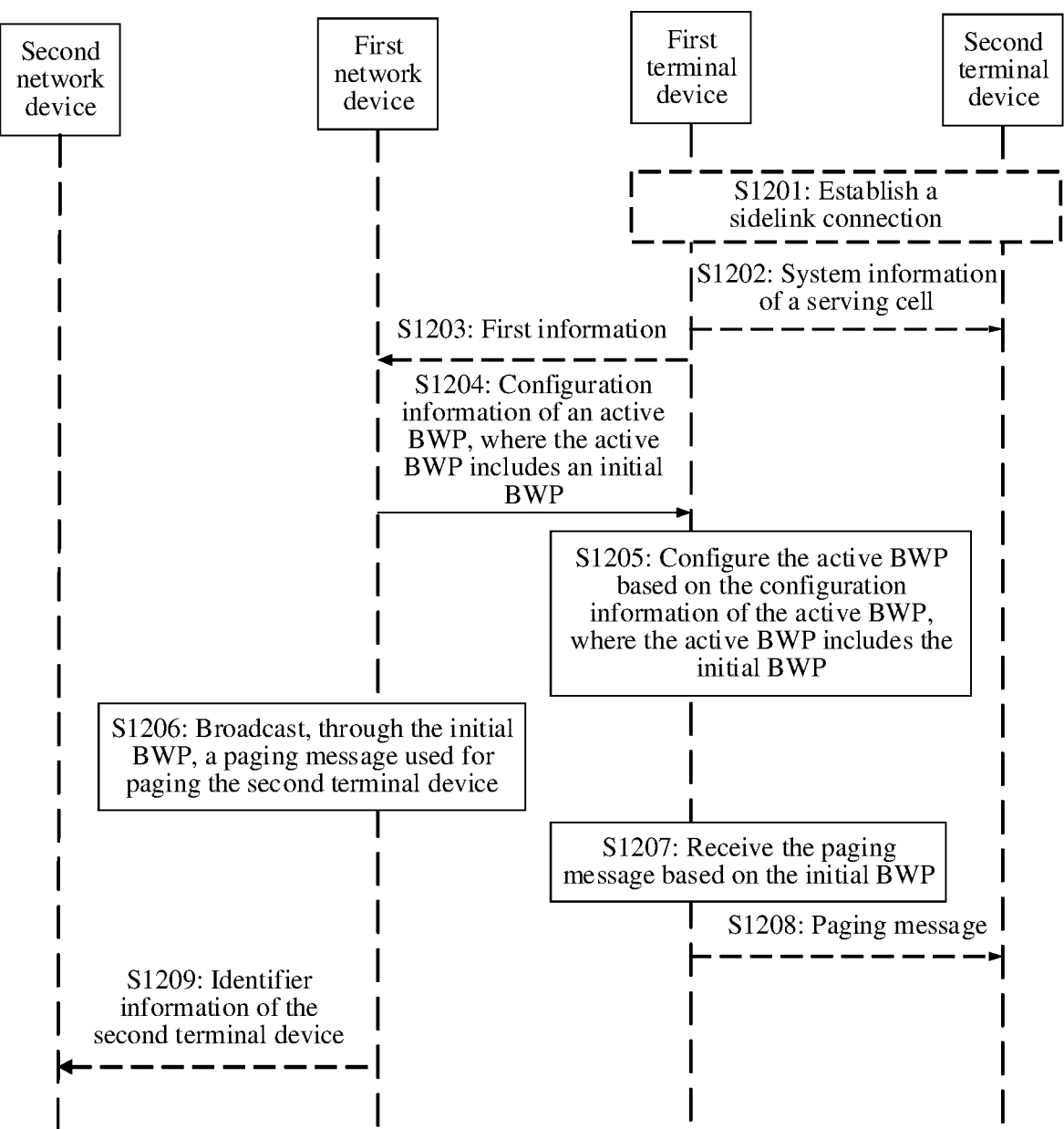
FIG. 12 is a schematic flowchart of a communication method according to an embodiment.

Based on the embodiment corresponding to FIG. 9, the first communication resource includes a BWP. FIG. 12 is a schematic flowchart of a communication method according to an embodiment. A first communication resource is an active BWP, a second communication resource is an initial BWP, and the active BWP includes the initial BWP. Alternatively, it may be understood that a common frequency domain range of the active BWP is extended in this embodiment, so that a frequency domain range of the active BWP includes a frequency domain range of the initial BWP. The initial BWP is used as an example for description in this embodiment. As shown in FIG. 12, the method may include the following steps:

S1201: A first terminal device establishes a sidelink connection to a second terminal device.

S1202: The first terminal device sends a system message of a serving cell to the second terminal device.

S1203: A first network device receives first information from the first terminal device.

S1204: The first network device sends configuration information of the active BWP to the first terminal device, where the active BWP includes the initial BWP.

In this embodiment, the initial BWP is used for receiving data by the first terminal device in a disconnected state, and the disconnected state includes an idle state or an inactive state. For example, the first terminal device is in a disconnected state, and the first terminal device may receive a message from the first network device through the initial BWP, so that the first terminal device can assist the second terminal device in establishing a connection to the first network device.

In this embodiment, the frequency domain range of the active BWP includes the frequency domain range of the initial BWP. It may be understood that a range of the frequency domain range of the active BWP may be set based on an actual application scenario. This is not limited in this embodiment.

S1205: The first terminal device configures the active BWP based on the configuration information of the active BWP, where the active BWP includes the initial BWP.

S1206: The first network device broadcasts, through the initial BWP, a paging message used for paging the second terminal device.

S1207: The first terminal device receives the paging message based on the initial BWP.

S1208: The first terminal device sends the paging message to the second terminal device.

In this embodiment, the first terminal device receives the paging message, and the first terminal device parses the paging message to identify an ID of the second terminal device, so that the first terminal device may send the paging message to the second terminal device through a PC5 interface. In this way, the second terminal device may establish an RRC connection to the first network device based in the paging message, so that the second terminal device and the first network device may normally communicate with each other.

S1209: The first network device sends identifier information of the second terminal device to a second network device.

In this embodiment, for S1201 to S1203 and S1209, refer to content adaptation descriptions of S1001 to S1003 and S1009. For S1204 to S1207, refer to content adaptation descriptions of S901 to S904. Details are not described herein again.

It should be noted that S1201 to S1203, S1208, and S1209 in this embodiment are optional steps, and one or more of the optional steps may be set based on an actual application scenario. A sequence of the steps in this embodiment may also be adjusted based on an actual application scenario. This is not limited in this embodiment.

In conclusion, the first network device sends the configuration information of the active BWP to the first terminal device, and the active BWP includes the initial BWP. In this way, the first network device may broadcast the paging message through the initial BWP, and the first terminal device may receive the paging message based on the initial BWP. The first terminal device may send an information message to the second terminal device, so that the second terminal device may establish an RRC connection to the first network device.

In a possible implementation, the first terminal device may simultaneously activate a plurality of BWPs. When the first terminal device listens to the paging message for the second terminal device, the first terminal device may receive the paging message through the method in this embodiment, and the first terminal device sends the paging message to the second terminal device, so that the second terminal device may establish the RRC connection to the first network device.

Figure 13:
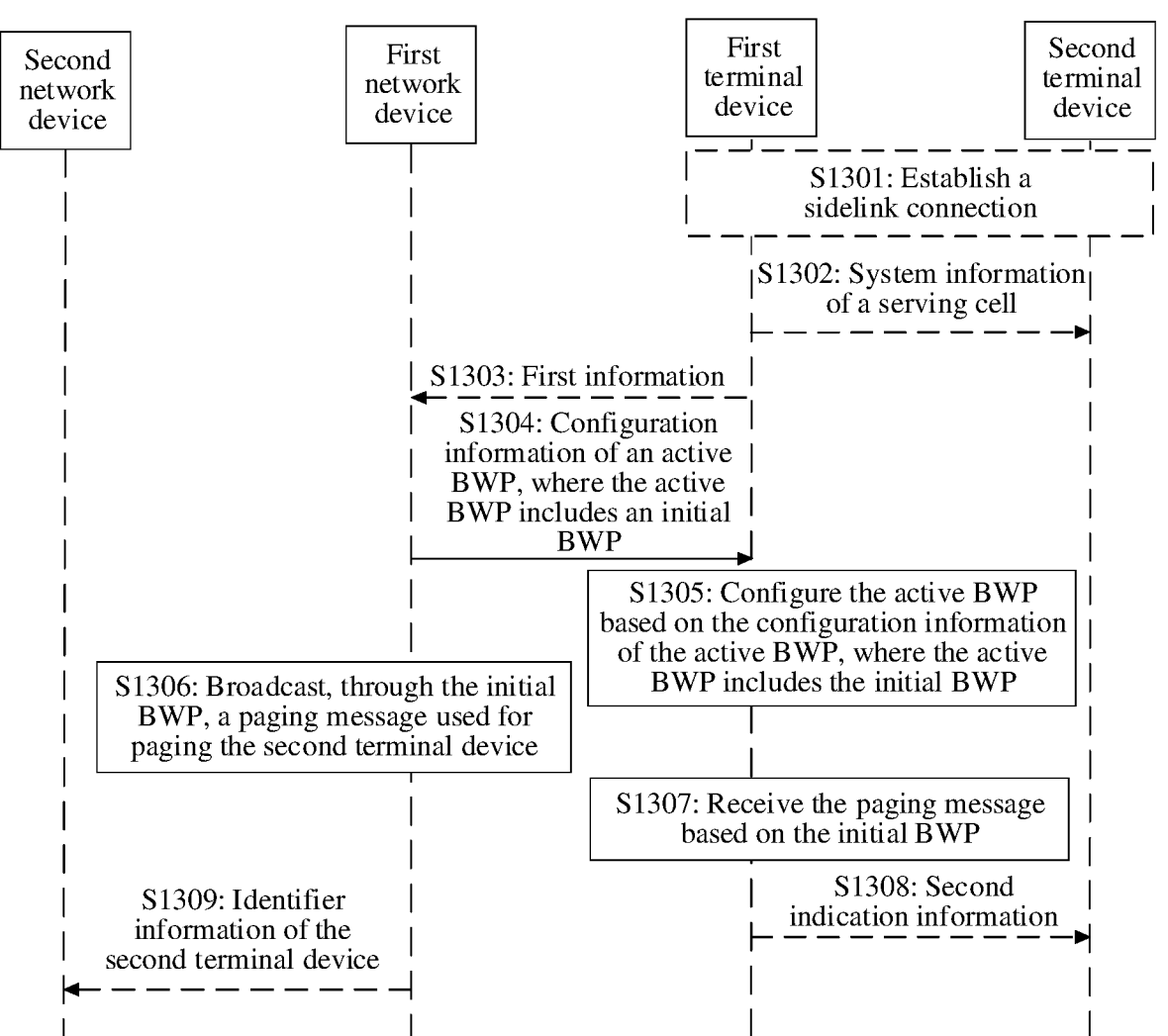
FIG. 13 is a schematic flowchart of a communication method according to an embodiment.

Based on the embodiment corresponding to FIG. 9, the first communication resource includes a BWP. FIG. 13 is a schematic flowchart of a communication method according to an embodiment. A first communication resource is an active BWP, a second communication resource is an initial BWP, and the active BWP includes the initial BWP. Alternatively, it may be understood that a common frequency domain range of the active BWP is extended in this embodiment, so that a frequency domain range of the active BWP includes a frequency domain range of the initial BWP. The initial BWP is used as an example for description in this embodiment. As shown in FIG. 13, the method may include the following steps:

S1301: A first terminal device establishes a sidelink connection to a second terminal device.

S1302: The first terminal device sends a system message of a serving cell to the second terminal device.

S1303: A first network device receives first information from the first terminal device.

S1304: The first network device sends configuration information of the active BWP to the first terminal device, where the active BWP includes the initial BWP.

S1305: The first terminal device configures the active BWP based on the configuration information of the active BWP, where the active BWP includes an initial BWP.

S1306: The first network device broadcasts, through the initial BWP, a paging message used for paging the second terminal device.

S1307: The first terminal device receives the paging message based on the initial BWP.

S1308: The first terminal device sends second indication information to the second terminal device.

In this embodiment, the second indication information indicates that the second terminal device is paged. In this way, the second terminal device may establish an RRC connection to the first network device based on the second indication information, so that a second network device and the second terminal device may normally communicate with each other.

S1309: The first network device sends identifier information of the second terminal device to the second network device.

In this embodiment, for S1301 to S1303 and S1309, refer to content adaptation descriptions of S1001 to S1003 and S1009. For S1304 to S1307, refer to content adaptation descriptions of S901 to S904. Details are not described herein again.

It should be noted that S1301 to S1303, S1308, and S1309 in this embodiment are optional steps, and one or more of the optional steps may be set based on an actual application scenario. A sequence of the steps in this embodiment may also be adjusted based on an actual application scenario. This is not limited in this embodiment.

In conclusion, the first network device sends the configuration information of the active BWP to the first terminal device, and the active BWP includes the initial BWP. In this way, the first network device broadcasts the paging message through the initial BWP, and the first terminal device may receive the paging message based on the initial BWP. The first terminal device may send the second indication information to the second terminal device, so that the second terminal device can establish the RRC connection to the first network device based on the second indication information, and the second network device and the second terminal device may normally communicate with each other.

In a possible implementation, the first terminal device may simultaneously activate a plurality of BWPs. When the first terminal device listens to a paging message for the second terminal device, the first terminal device may still receive the paging message through the method in this embodiment, and the first terminal device sends the paging message to the second terminal device, so that the second terminal device can establish the RRC connection to the first network device.

The foregoing describes the methods in embodiments with reference to FIG. 9 to FIG. 13, and the following describes a communication apparatus for performing the foregoing methods provided in embodiments. The communication apparatus includes one or more modules, configured to implement the methods in the steps included in FIG. 9 to FIG. 13, and the one or more modules may correspond to the steps of the methods in the steps included in FIG. 9 to FIG. 13. For each step in a method performed by a first network device in this embodiment, the first network device has a unit or a module that performs each step in the method. For each step in a method performed by a first terminal device, the first terminal device has a unit or a module that performs each step in the method. For example, a module that controls or processes an action of the communication apparatus may be referred to as a processing module. A module that performs a step of processing a message or data on a communication apparatus side may be referred to as a communication module.

Figure 14:
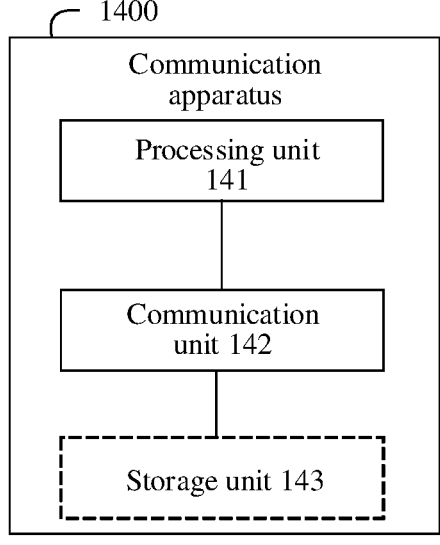
FIG. 14 is a schematic diagram of a structure of a communication apparatus according to an embodiment.

The following uses an example in which functional modules are obtained through division corresponding to each function for description:

For example, FIG. 14 is a schematic diagram of a structure of a communication apparatus 1400 according to an embodiment. As shown in FIG. 14, the communication apparatus 1400 may be a first network device or a first terminal device or may be a chip applied to the first network device or the first terminal device. The communication apparatus 1400 includes a processing unit 141 and a communication unit 142. The communication unit 142 is configured to support the communication apparatus in performing an information sending or receiving step, and the processing unit 141 is configured to support the communication apparatus in performing an information processing step.

In a possible implementation, the communication apparatus 1400 described in this embodiment may perform content described in the embodiment corresponding to FIG. 9.

In a possible embodiment, when the communication apparatus 1400 is configured to perform an operation performed by the first network device, the communication unit 142 is configured to send configuration information of a first communication resource to the first terminal device.

The communication unit 142 is further configured to broadcast, through the first communication resource, a paging message used for paging a second terminal device.

In a possible embodiment, when the communication apparatus 1400 is configured to perform an operation performed by the first terminal device, the processing unit 141 is configured to configure the first communication resource based on the configuration information of the first communication resource.

The communication unit 142 is configured to receive the paging message based on the first communication resource.

In a possible implementation, the communication apparatus 1400 described in this embodiment may perform content described in the embodiment corresponding to FIG. 10.

In a possible embodiment, when the communication apparatus 1400 is configured to perform the operation performed by the first network device, the communication unit 142 is configured to receive first information from the first terminal device.

The communication unit 142 is further configured to send configuration information of an active BWP to the first terminal device.

The communication unit 142 is further configured to broadcast, through the active BWP, the paging message used for paging the second terminal device.

The communication unit 142 is further configured to send identifier information of the second terminal device to a second network device.

In a possible embodiment, when the communication apparatus 1400 is configured to perform the operation performed by the first terminal device, the processing unit 141 is configured to establish a sidelink connection to the second terminal device.

The communication unit 142 is configured to send a system message of a serving cell to the second terminal device.

The processing unit 141 is further configured to configure the active BWP based on the configuration information of the active BWP.

The communication unit 142 is further configured to receive the paging message based on the active BWP.

The communication unit 142 is further configured to send the paging information to the second terminal device.

In a possible implementation, the communication apparatus 1400 described in this embodiment may perform content described in the embodiment corresponding to FIG. 11.

In a possible embodiment, when the communication apparatus 1400 is configured to perform the operation performed by the first network device, the communication unit 142 is configured to receive the first information from the first terminal device.

The communication unit 142 is further configured to send configuration information of the active BWP to the first terminal device.

The communication unit 142 is further configured to broadcast, through the active BWP, the paging message used for paging the second terminal device.

The communication unit 142 is further configured to send the identifier information of the second terminal device to the second network device.

In a possible embodiment, when the communication apparatus 1400 is configured to perform the operation performed by the first terminal device, the processing unit 141 is configured to establish the sidelink connection to the second terminal device.

The communication unit 142 is configured to send the system message of the serving cell to the second terminal device.

The processing unit 141 is further configured to configure the active BWP based on the configuration information of the active BWP.

The communication unit 142 is further configured to receive the paging message based on the active BWP.

The communication unit 142 is further configured to send the second indication information to the second terminal device.

In a possible implementation, the communication apparatus 1400 described in this embodiment may perform content described in the embodiment corresponding to FIG. 12.

In a possible embodiment, when the communication apparatus 1400 is configured to perform the operation performed by the first network device, the communication unit 142 is configured to receive the first information from the first terminal device.

The communication unit 142 is further configured to send the configuration information of the active BWP to the first terminal device, where the active BWP includes an initial BWP.

The communication unit 142 is further configured to broadcast, through the initial BWP, the paging message used for paging the second terminal device.

The communication unit 142 is further configured to send the identifier information of the second terminal device to the second network device.

In a possible embodiment, when the communication apparatus 1400 is configured to perform the operation performed by the first terminal device, the processing unit 141 is configured to establish the sidelink connection to the second terminal device.

The communication unit 142 is configured to send the system message of the serving cell to the second terminal device.

The processing unit 141 is further configured to configure the active BWP based on the configuration information of the active BWP, where the active BWP includes the initial BWP.

The communication unit 142 is further configured to receive the paging message based on the initial BWP.

The communication unit 142 is further configured to send the paging message to the second terminal device.

In a possible implementation, the communication apparatus 1400 described in this embodiment may perform content described in the embodiment corresponding to FIG. 13.

In a possible embodiment, when the communication apparatus 1400 is configured to perform the operation performed by the first network device, the communication unit 142 is configured to receive the first information from the first terminal device.

The communication unit 142 is further configured to send the configuration information of the active BWP to the first terminal device, where the active BWP includes the initial BWP.

The communication unit 142 is further configured to broadcast, through the initial BWP, the paging message used for paging the second terminal device.

The communication unit 142 is further configured to send the identifier information of the second terminal device to the second network device.

In a possible embodiment, when the communication apparatus 1400 is configured to perform the operation performed by the first terminal device, the processing unit 141 is configured to establish the sidelink connection to the second terminal device.

The communication unit 142 is configured to send the system message of the serving cell to the second terminal device.

The processing unit 141 is further configured to configure the active BWP based on the configuration information of the active BWP, where the active BWP includes the initial BWP.

The communication unit 142 is further configured to receive the paging message based on the initial BWP.

The communication unit 142 is further configured to send the second indication information to the second terminal device.

It should be noted that the foregoing is an example in which the communication apparatus 1400 performs some operations of the first terminal device or the first network device. The communication unit 142 and the processing unit 141 may be further configured to perform other processing, receiving, or sending steps or operations performed by the first terminal device or the first network device in the foregoing method embodiments. Details are not described herein again.

In a possible embodiment, the communication apparatus 1400 may further include a storage unit 143. The processing unit 141, the communication unit 142, and the storage unit 143 are connected by a communication line.

The storage unit 143 may include one or more memories, and the memory may be a device that is in one or more devices or circuits and that is configured to store a program or data.

The storage unit 143 may exist independently and may be connected to the processing unit 141 of the communication apparatus by the communication line. The storage unit 143 may also be integrated with the processing unit.

The communication apparatus may be used in a communication device, a circuit, a hardware component, or a chip.

For example, the communication apparatus may be a chip or a chip system in the first network device or the first terminal device in the embodiment, and the communication unit 142 may be an input interface or an output interface, a pin, a circuit, or the like.

For example, the storage unit 143 may store a computer-executable instruction of the method that performed by the first network device or the first terminal device, so that the processing unit 141 performs the method that performed by the first network device or the first terminal device in the foregoing embodiment. The storage unit 143 may be a register, a cache, an RAM, or the like, and the storage unit 143 may be integrated with the processing unit 141. The storage unit 143 may be a ROM or another type of static storage device that can store static information and instructions, and the storage unit 143 may be independent from the processing unit 141.

Figure 15:
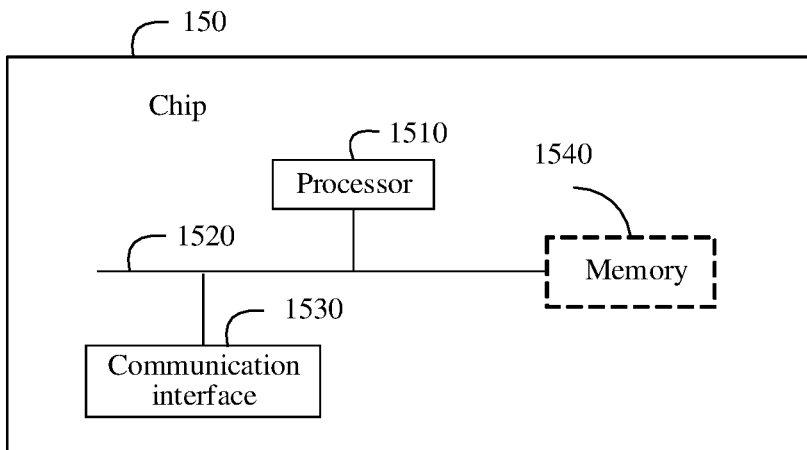
FIG. 15 is a schematic diagram of a structure of a chip according to an embodiment.

For example, FIG. 15 is a schematic diagram of a structure of a chip 150 according to an embodiment. The chip 150 includes one or more than two (including two) processors 1510 and a communication interface 1530.

In some implementations, a memory 1540 stores the following elements: an executable module or a data structure, a subset thereof, or an extended set thereof.

In this embodiment, the memory 1540 may include a read-only memory and a random access memory and provide instructions and data for the processor 1510. A part of the memory 1540 may further include a non-volatile random access memory (NVRAM).

In this embodiment, the processor 1510 may control a first transmission chip, a second transmission chip, or a processing chip to perform a corresponding operation by invoking an operation instruction (the operation instruction may be stored in an operating system) stored in the memory 1540. The processor 1510 may be referred to as a central processing unit (CPU).

In this embodiment, the memory 1540, the communication interface 1530, and the memory 1540 are coupled together by a bus system 1520. In addition to a data bus, the bus system 1520 may further include a power bus, a control bus, a status signal bus, and the like. For ease of description, various buses are marked as the bus system 1520 in FIG. 15.

The methods described in the foregoing embodiments may be applied to the processor 1510 or may be implemented by the processor 1510. The processor 1510 may be an integrated circuit chip and may have a signal processing capability. In an implementation process, the steps of the foregoing methods may be completed through an integrated logic circuit of hardware in the processor 1510 or instructions in a form of software. The processor 1510 may be a general purpose processor (for example, a microprocessor or a conventional processor), a digital signal processor (DSP), an application specific integrated circuit (ASIC), or a field-programmable gate array (FPGA), or another programmable logic device, a discrete gate, a transistor logic device, or a discrete hardware component. The processor 1510 may implement or execute the methods, steps, and logical block diagrams in the embodiments.

The steps of the methods with reference to the embodiments may be directly performed and completed by a hardware decoding processor or may be performed and completed through a combination of a hardware and software module in the decoding processor. The software module may be located in a mature storage medium in this field, such as a random access memory, a flash memory, a read-only memory, a programmable read-only memory, an electrically erasable programmable memory, or a register. The storage medium is located in the memory 1540. The processor 1510 reads information in the memory 1540 and completes the steps of the foregoing methods in combination with the hardware of the processor 1510.

In a possible implementation, the communication interface 1530 is configured to perform the receiving and sending steps of the first network device or the first terminal device in embodiments shown in FIG. 9 to FIG. 13. The processor 1510 is configured to perform the processing steps of the first network device or the first terminal device in embodiments shown in FIG. 9 to FIG. 13.

In the foregoing embodiment, an instruction that is stored in the memory and that is executed by the processor may be implemented in a form of a computer program product. The computer program product may be written into the memory in advance or may be downloaded in a form of software and installed in the memory.

The computer program product includes one or more computer instructions. When the computer program instructions are loaded and executed on a computer, all or some of the procedures or functions according to embodiments are generated. The computer may be a general purpose computer, a dedicated computer, a computer network, or another programmable apparatus. The computer instruction may be stored in a non-transitory computer-readable storage medium. The non-transitory computer-readable storage medium may be any usable medium that can be stored by a computer, or a data storage device such as a server or a data center integrated with one or more usable media. For example, the usable medium may include a magnetic medium (for example, a floppy disk, a hard disk, or a magnetic tape), an optical medium (for example, a digital versatile disc (DVD)), or a semiconductor medium (for example, a solid state disk SSD)), and the like.

An embodiment may further provide a non-transitory computer-readable storage medium. All or some of the methods described in the foregoing embodiments may be implemented through software, hardware, firmware, or any combination thereof. If the methods are implemented through the software, a function may be stored on the non-transitory computer-readable medium as one or more instructions or code The non-transitory computer-readable medium may include a compact disc read-only memory (CD-ROM), an RAM, a ROM, an EEPROM, or another optical disc memory. The computer-readable medium may include a magnetic disk storage or another magnetic disk storage device. Moreover, any connection line may also be appropriately referred to as the computer-readable medium. For example, when the software is transmitted from a website, server or another remote source by using a coaxial cable, fiber optic cable, twisted pair, DSL or wireless technology (for example, infrared, radio and microwave), then the coaxial cable, fiber optic cable, twisted pair, DSL or wireless technologies such as infrared, radio and microwave are included in a definition of the medium. A disk and an optical disk as used herein include an optical disk (CD), a laser disk, a digital versatile disc (DVD), a floppy disk, and a blue-ray disc, where the disk generally reproduces data by magnetic means, while the optical disk optically reproduces data by using laser. The combination of the above shall also be included in the scope of the computer-readable medium.

An embodiment may further provide a computer program product. All or some of the methods described in the foregoing embodiments may be implemented through software, hardware, firmware, or any combination thereof. If the methods are implemented through the software, all or part of the implementation may be implemented in the form of the computer program product. The computer program product includes one or more computer instructions. When the foregoing computer program instructions are loaded and executed on a computer, all or some of the procedures or functions described in the foregoing method embodiments are produced. The computer may be a general purpose computer, a dedicated computer, a computer network, a base station, a terminal, or another programmable apparatus.

The objectives, solutions, and beneficial effects of the embodiments are described in detail in the foregoing embodiments. It should be understood that the foregoing are merely embodiments and are not intended as limiting. Any modification, equivalent replacement, improvement, or the like shall fall within the scope of the embodiments.

What is claimed is:

1. A communication method, applied to a first network device, the method comprising:

sending configuration information of a first communication resource to a first terminal device, wherein the first terminal device provides a relay service for a second terminal device, the first communication resource is used for communication between the first terminal device in a connected state and the first network device; and broadcasting, through the first communication resource, a paging message used for paging the second terminal device, wherein reception of the paging message by the first terminal device causes the first terminal device to send second indication information to the second terminal device, the second indication information indicating that the second terminal device is paged.

2. The communication method according to claim 1, wherein the first terminal device is a relay terminal device and the second terminal device is a remote terminal device.

3. The communication method according to claim 1 further comprising:

receiving first information from the first terminal device, wherein the first information indicates that a sidelink connection exists between the first terminal device and the second terminal device.

4. The communication method according to claim 3, wherein the first information is a dedicated information element.

5. The communication method according to claim 3, wherein the first information comprises identifier information of the second terminal device.

6. The communication method according to claim 5, wherein the paging message comprises a paging message related to the identifier information of the second terminal device.

7. The communication method according to claim 5, wherein the identifier information of the second terminal device comprises a 5G s-temporary mobile subscriber identity (5G-S-TMSI) or a full inactive radio network temporary identifier full (I-RNTI).

8. A communication method, applied to a first terminal device, the method comprising:

receiving configuration information of a first communication resource from a first network device, wherein the first terminal device provides a relay service for a second terminal device, wherein the first communication resource is used for communication between the first terminal device in a connected state and the first network device;

configuring the first communication resource based on the configuration information;

receiving a paging message based on the first communication resource; and sending second indication information to the second terminal device, wherein the second indication information indicates that the second terminal device is paged.

9. The communication method according to claim 8, further comprising:

receiving a radio resource control (RRC) message from the first network device, wherein the RRC message comprises the paging message.

10. The communication method according to claim 8, further comprising:

sending first information to the first network device, wherein the first information indicates that a sidelink connection exists between the first terminal device and the second terminal device.

11. The communication method according to claim 10, wherein the first information comprises identifier information of the second terminal device.

12. The communication method according to claim 11, wherein the paging message comprises a paging message related to the identifier information of the second terminal device.

13. The communication method according to claim 11, wherein the identifier information of the second terminal device comprises a 5G s-temporary mobile subscriber identity (5G-S-TMSI) or a full inactive radio network temporary identifier full (I-RNTI).

14. A communication apparatus, applied to a first terminal device, the apparatus comprising a communication unit and a processing unit;

the communication unit is configured to receive configuration information of a first communication resource from a first network device, wherein the first terminal device provides a relay service for a second terminal device, wherein the first communication resource is used for communication between the first terminal device in a connected state and the first network device;

the processing unit is configured to configure the first communication resource based on the configuration information;

the communication unit is configured to receive a paging message based on the first communication resource; and the communication unit is further configured to send second indication information to the second terminal device, wherein the second indication information indicates that the second terminal device is paged.

15. The communication apparatus according to claim 14, wherein the communication unit is further configured to send first information to the first network device, wherein the first information indicates that a sidelink connection exists between the first terminal device and the second terminal device.

16. The communication apparatus according to claim 15, wherein the first information comprises identifier information of the second terminal device.

17. The communication method according to claim 16, wherein the paging message comprises a paging message related to the identifier information of the second terminal device.

18. The communication apparatus according to claim 16, wherein the identifier information of the second terminal device comprises a 5G s-temporary mobile subscriber identity (5G-S-TMSI) or a full inactive radio network temporary identifier full (I-RNTI).

* * * * *